(12) United States Patent
Biebricher et al.

(10) Patent No.: US 11,353,474 B2
(45) Date of Patent: Jun. 7, 2022

(54) SPECIFIC FEATURE FOR FIXING A WHEEL SPEED SENSOR IN A TRUCK

(71) Applicant: Continental Teves AG & Co. oHG, Frankfurt am Main (DE)

(72) Inventors: Lothar Biebricher, Oberursel (DE); Ulrich Schrader, Wöllstadt (DE); Felix Ruhmann, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 7 days.

(21) Appl. No.: 16/711,728

(22) Filed: Dec. 12, 2019

(65) Prior Publication Data
US 2020/0200786 A1 Jun. 25, 2020

(30) Foreign Application Priority Data
Dec. 21, 2018 (DE) ...................... 10 2018 009 964.5

(51) Int. Cl.
*G01P 1/02* (2006.01)
*G01P 3/44* (2006.01)

(52) U.S. Cl.
CPC ................ *G01P 1/026* (2013.01); *G01P 3/44* (2013.01)

(58) Field of Classification Search
CPC .................................. G01P 1/026; G01P 3/44
See application file for complete search history.

(56) References Cited

U.S. PATENT DOCUMENTS

| | | |
|---|---|---|
| 5,123,755 A | 6/1992 | Faye et al. |
| 5,929,629 A | 7/1999 | Hiraoka et al. |
| 6,392,406 B1 * | 5/2002 | Palfenier .................. G01P 1/026 324/174 |
| 6,463,818 B1 * | 10/2002 | Stagg .................... G01D 11/245 16/2.1 |
| 6,792,650 B2 * | 9/2004 | Stagg ......................... B60P 3/36 16/2.1 |
| 7,098,651 B2 | 8/2006 | Matsumoto et al. |
| 9,921,236 B2 | 3/2018 | Dalisdas et al. |
| 10,871,501 B2 * | 12/2020 | Zhou ........................ G01P 3/487 |
| 2011/0023265 A1 * | 2/2011 | Singbartl ................ B60T 8/329 16/2.1 |

(Continued)

FOREIGN PATENT DOCUMENTS

| | | |
|---|---|---|
| CN | 1494656 A | 5/2004 |
| CN | 101842666 A | 9/2010 |

(Continued)

OTHER PUBLICATIONS

Chinese Office Action for Chinese Application No. 201911308822.5, dated Mar. 12, 2021, 7 pages.

(Continued)

*Primary Examiner* — Nathaniel T Woodward
(74) *Attorney, Agent, or Firm* — RatnerPrestia

(57) ABSTRACT

A wheel speed sensor includes at least one sensor element, at least one signal processing circuit, as well as at least one first plastics-material housing which houses or at least partially exposes the sensor element and the signal processing circuit, wherein the sensor has a cap, in particular from metal, wherein the sensor has a clamping device which is connected so as to be integral to the cap and/or is integrated in the cap.

10 Claims, 4 Drawing Sheets

(56) References Cited

U.S. PATENT DOCUMENTS

| | | | | |
|---|---|---|---|---|
| 2014/0167741 | A1* | 6/2014 | Pan | G01P 1/00 |
| | | | | 324/160 |
| 2015/0198623 | A1* | 7/2015 | Dalisdas | G01P 1/026 |
| | | | | 701/70 |
| 2015/0331005 | A1* | 11/2015 | Dalisdas | G01P 3/488 |
| | | | | 701/72 |
| 2018/0112698 | A1* | 4/2018 | Kluftinger | F16B 2/245 |
| 2020/0339105 | A1 | 10/2020 | Kluftinger et al. | |

FOREIGN PATENT DOCUMENTS

| | | |
|---|---|---|
| CN | 104903730 A | 9/2015 |
| CN | 105371883 A | 3/2016 |
| DE | 2243331 A1 | 3/1974 |
| DE | 19743541 A1 | 9/1998 |
| DE | 102018000221 A1 | 7/2019 |
| JP | 09218215 A | 8/1997 |

OTHER PUBLICATIONS

German Examination Report for German Application No. 10 2019 220 194.6, dated Dec. 8, 2021, with translation, 8 pages.

\* cited by examiner

SPECIFIC FEATURE FOR FIXING A WHEEL SPEED SENSOR IN A TRUCK

CROSS REFERENCE TO RELATED APPLICATIONS

This application claims priority to German Patent Application No. 10 2018 009 964.5, filed Dec. 21, 2018, the contents of such application being incorporated by reference herein.

FIELD OF THE INVENTION

The invention relates to a speed sensor arrangement.

BACKGROUND OF THE INVENTION

Wheel speed sensors having a metal cap for trucks, which by means of a sleeve having an additional spring are pushed into the bore of the stub axle of the wheel assembly and are fixedly positioned therein are known from the prior art.

SUMMARY OF THE INVENTION

An aspect of the invention is based on a wheel speed sensor which is capable of being produced in a relatively cost-effective and/or relatively simple manner and/or is relatively simple to assemble and/or is relatively robust.

The wording "at least partially exposed" is preferably understood such that the sensor element and the signal processing circuit are surrounded or housed, respectively, by an internal second housing, or second plastics-material housing, respectively, and the first plastics-material housing has a clearance in that region where the sensor element and the signal processing circuit are disposed, said clearance exposing the second housing.

The internal second plastics-material housing is expediently configured such that said internal second plastics-material housing tightly houses, or embeds, respectively, the sensor element and the signal processing circuit.

The sensor element and the signal processing circuit are preferably integrated on a common chip, or ASIC, respectively.

The term sensor is expediently understood to be the wheel speed sensor.

It is preferable for the clamping device to be configured as a clamping sleeve that is integrated in the cap.

It is expedient for the cap to be connected to the first plastics-material housing by means of clinching, or clinch-joining, respectively, or staking or pressure-joining, respectively. The cap herein encompasses the first plastics-material housing at least in part, or is plug-fitted onto the plastics-material housing.

It is preferable for the staking, or the clinching, respectively, between the cap and the first plastics-material housing to be configured substantially as a form-fit, wherein the cap is push-fitted onto a collar of the first plastics-material housing, assumes a tight fit thereon and, by means of one or a plurality of contours which are in particular configured so as to be finger-shaped and which are bent inward/toward the first plastics-material housing, engages in a rudimentary/superficial manner in the material of the first plastics-material housing.

The sensor preferably has an annular seal or O-ring, respectively, which is in particular disposed in a groove about the first plastics-material housing and, in the case of a sleeve plug-fitted onto the first plastics-material housing, forms a seal. The annular seal is particularly preferably configured from elastomer.

In the case of spring elements having slots, the wheel speed sensor preferably does not require any annular seal, since a fluid which could potentially ingress between the first plastics-material housing and the cap could escape again through the slots.

The sensor below the first plastics-material housing preferably has a carrier, or a support element, respectively, which in order to be overmolded with the first plastics-material housing can be utilized, or is utilized, respectively, for positioning in an injection-molding tool.

The clamping device preferably comprises a plurality of spring element which are disposed on the external shell of the cap, or sleeve, respectively, and which are connected, in particular so as to be integral, to said cap.

All spring elements are expediently configured so as to be identical.

The cap is preferably configured as a substantially cylindrical body, for example from iron or aluminum, or at least comprises said materials. The closed cap head on the edge there of is chamfered, in particular in an encircling manner. The cap is expediently configured as a deep-drawn part from metal.

The cap is preferably configured such that the metal periphery on the open side, or the open end of the cap, respectively, is configured so as to bulge outward.

The spring elements are preferably configured from the material of the cap, are connected so as to be integral to said cap, and in terms of the cap shell are configured so as to bulge and/or curve outward, wherein said bend is in particular configured so as to be progressively curved or straight.

The cap expediently has slots which are in particular disposed or molded, respectively, directly on each of the spring elements.

It is expedient for the cap, or the clamping device thereof, respectively, to be configured such that said cap in terms of a revolution about the shell has 2 or 3 or more spring elements, in particular 2 or 3 or more rows of spring elements, wherein each row particularly preferably comprises 2 or 3 or more spring elements. Said spring elements herein are particularly preferably disposed so as to be symmetrical and/or equidistant and/or identically spaced apart within a row one behind the other or in relation to one another and/or in relation to the shell of the cap. For example, the cap, or the clamping device thereof, respectively, comprises 6 or 9 spring elements.

It is preferable for the sensor to be configured as a wheel speed sensor for trucks, or as a truck wheel speed sensor, respectively.

An aspect of the invention moreover relates to a sensor assembly, wherein the wheel speed sensor by way of the cap is push-fitted into the bore of a sensor receptacle of a truck wheel assembly.

DETAILED DESCRIPTION OF THE PREFERRED EMBODIMENTS

Figure 1A:
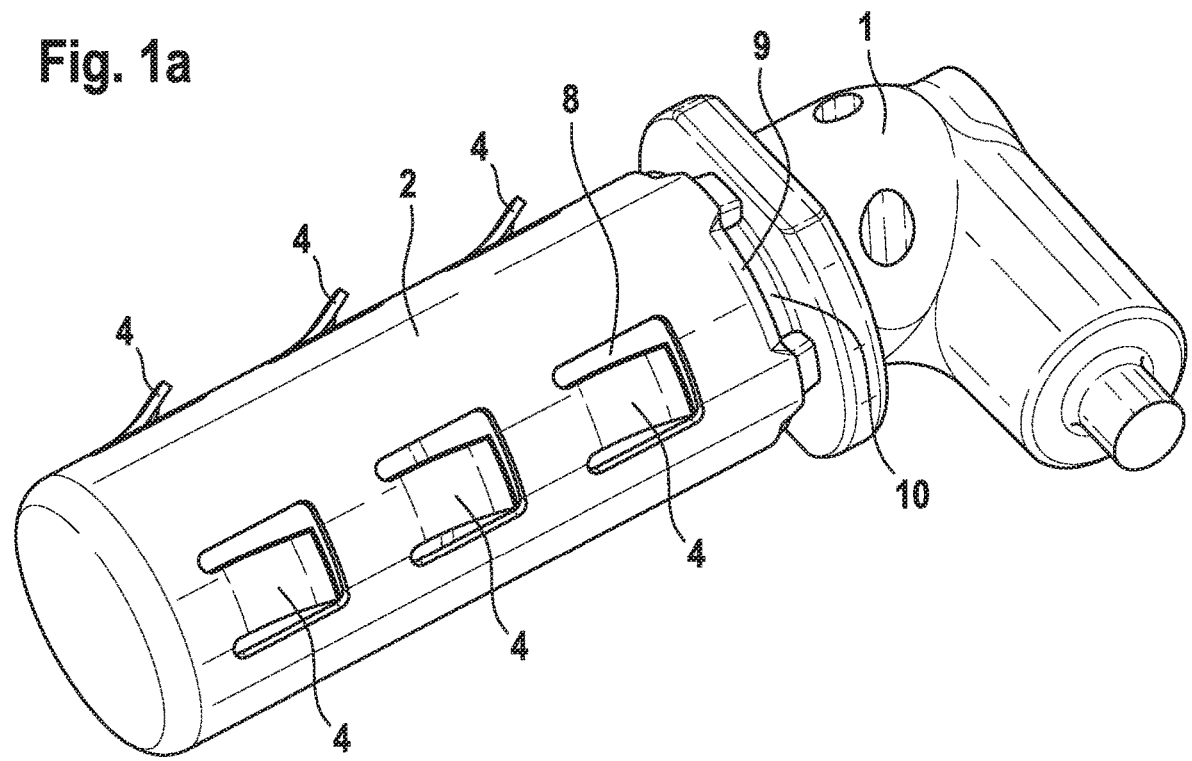
FIG. 1A shows an exemplary wheel speed sensor having a cap.
Figure 1B:
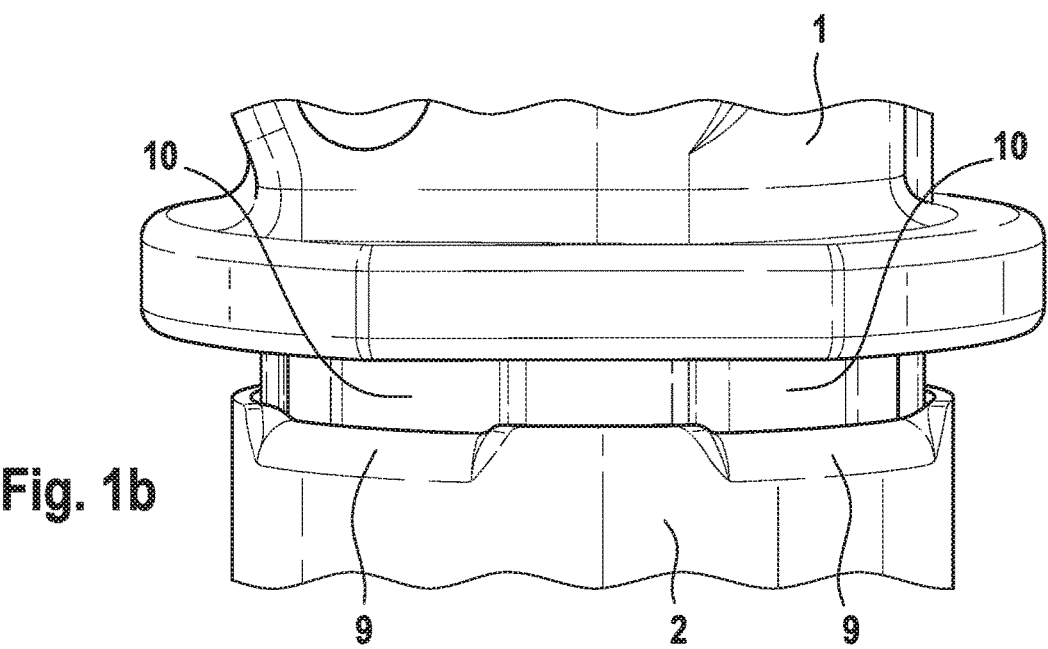
FIG. 1B shows the exemplary staking between the cap and the first plastics-material housing.

FIG. 1A shows an exemplary embodiment of the wheel speed sensor for trucks, comprising the first plastics-material housing 1, the cap 2 from metal, having the sensor element and the signal processing circuit (both not illustrated) being push-fitted onto the collar of said plastics-material housing 1 and being staked to the first plastics-material housing 1. The cap 1 has 9 spring elements 4 of which six can be seen. The staking of the cap 2 can be seen in FIG. 1A and by means of FIG. 1B is visualized in even more detail, said cap 2 to this end having contours, or fingers 9, respectively, which engage in each case in a clearance 10 of the first plastics-material housing 1 and even superficially penetrate the latter.

Figure 2A:
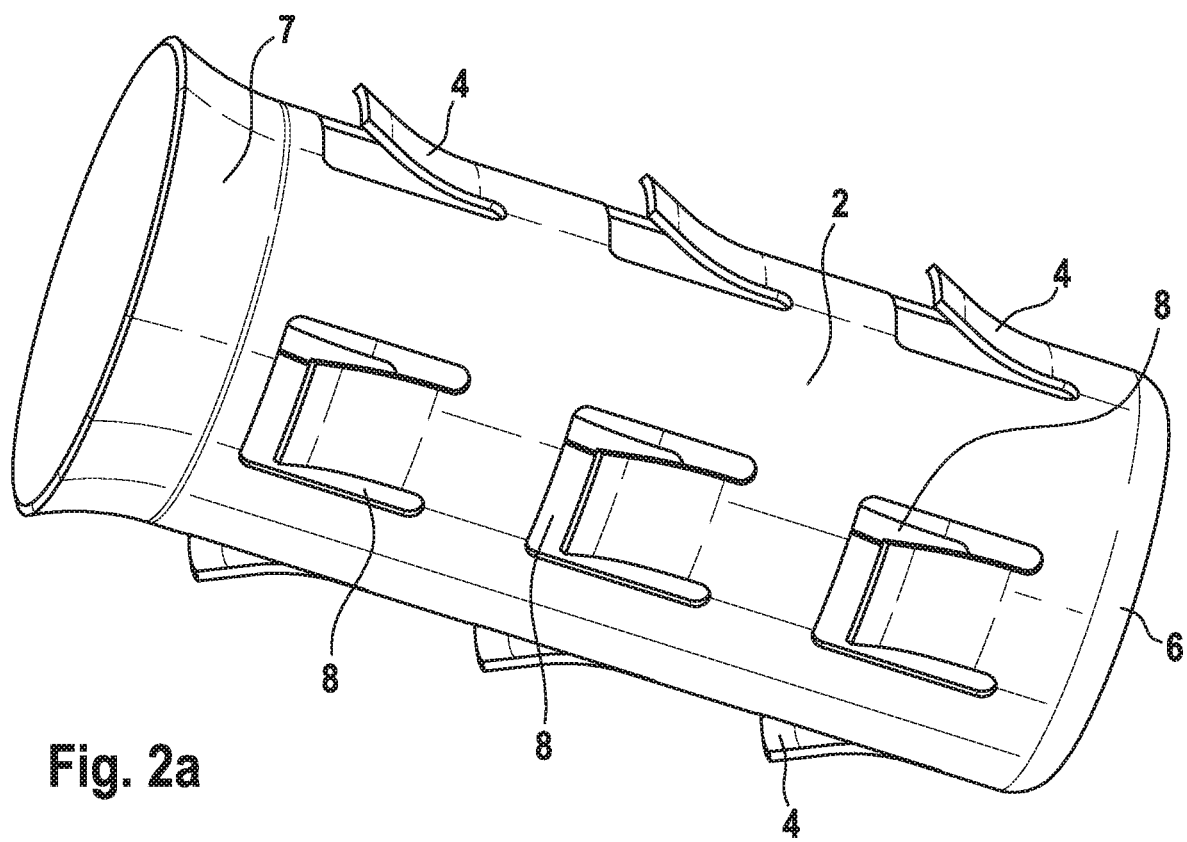
FIGS. 2A to 4C show in each case exemplary embodiments of caps having an integrated clamping device, or spring elements, respectively, in each case in three different views.
Figure 2B:
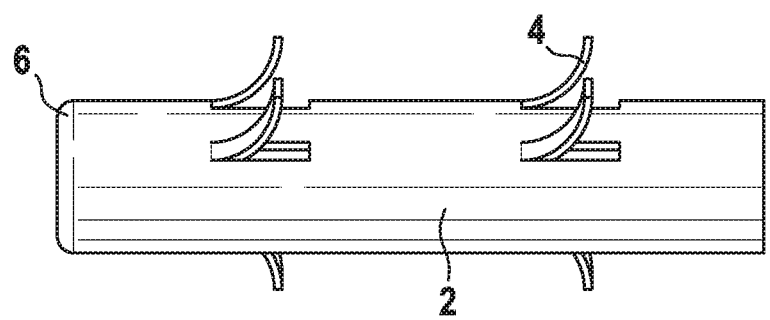
Figure 2C:
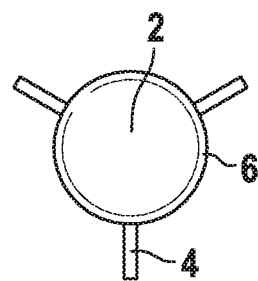

An exemplary cap 2 having spring elements 4 is visualized by means of FIGS. 2A-2C. Herein, in FIG. 2A in a three-dimensional view, in FIG. 2B in a lateral view, and in FIG. 2C in a plan view.

The cap 2 is configured so as to be substantially cylindrical; the closed head of said cap 2 in terms of the encircling edge thereof being chamfered 6, or radiused, or having a chamfer 6, respectively. The opened end has an outwardly bulging edge 7 of the shell. The cap 2 as the clamping device 4 has three encircling symmetrical rows having in each case three spring elements 4 which are identically spaced apart at least within the row. The spring elements 4 herein are in each case punched out as rectangular tabs which have been released on three sides and thereon have a slot 8, wherein said tabs are in each case bent outward in an identical manner by way of a curvature which according to the example is progressive.

Figure 3A:
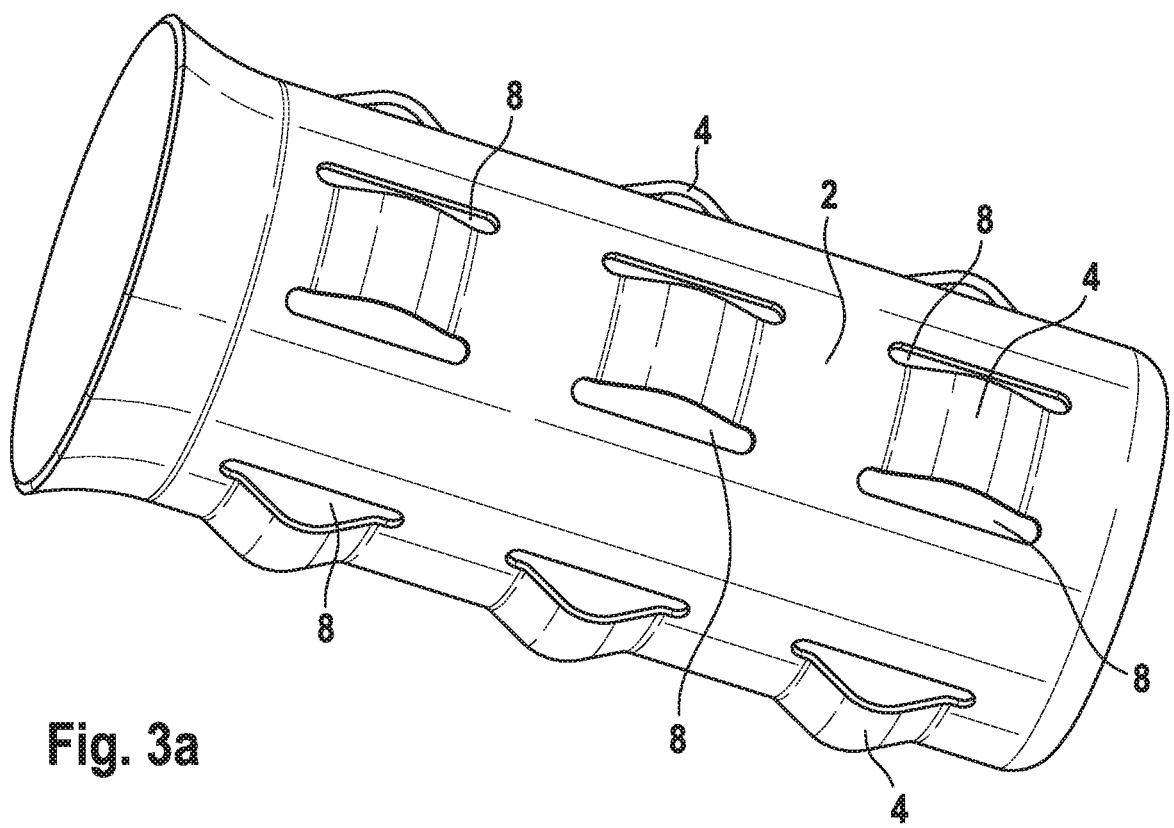
Figure 3B:
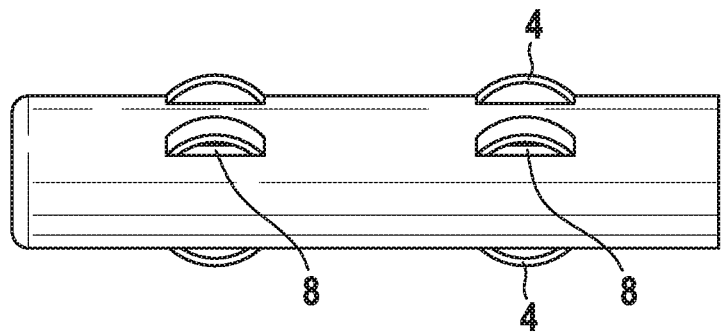
Figure 3C:
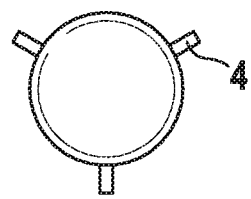

The exemplary embodiment of the cap 2 likewise illustrated in three views by means of FIGS. 3A-3C has spring elements 4 which are different in comparison to the cap 2 from FIGS. 2A-2C. Like those described in the context of FIG. 2, these spring elements 4 are disposed so as to be symmetrical.

The spring elements 4 from FIGS. 3A-3C are spring elements having a rectangular base area punched out of the shell of the cap 2 so as to be released laterally on the left and right, wherein the punched features configure in each case a slot 8, and the spring element in this instance being forced out of the shell of the cap 2, or shaped therefrom in the manner of an elevation. The cap embodied according to the example can be relatively easily extracted, or disassembled, respectively, from a bore for receiving the wheel speed sensor. The width and the length of the spring elements 4 in an exemplary manner are 3 mm by 5 mm in terms of the rectangular base area, and 1 to 3 mm are provided in an exemplary manner in terms of the height to which extent the spring element 4 projects.

Figure 4A:
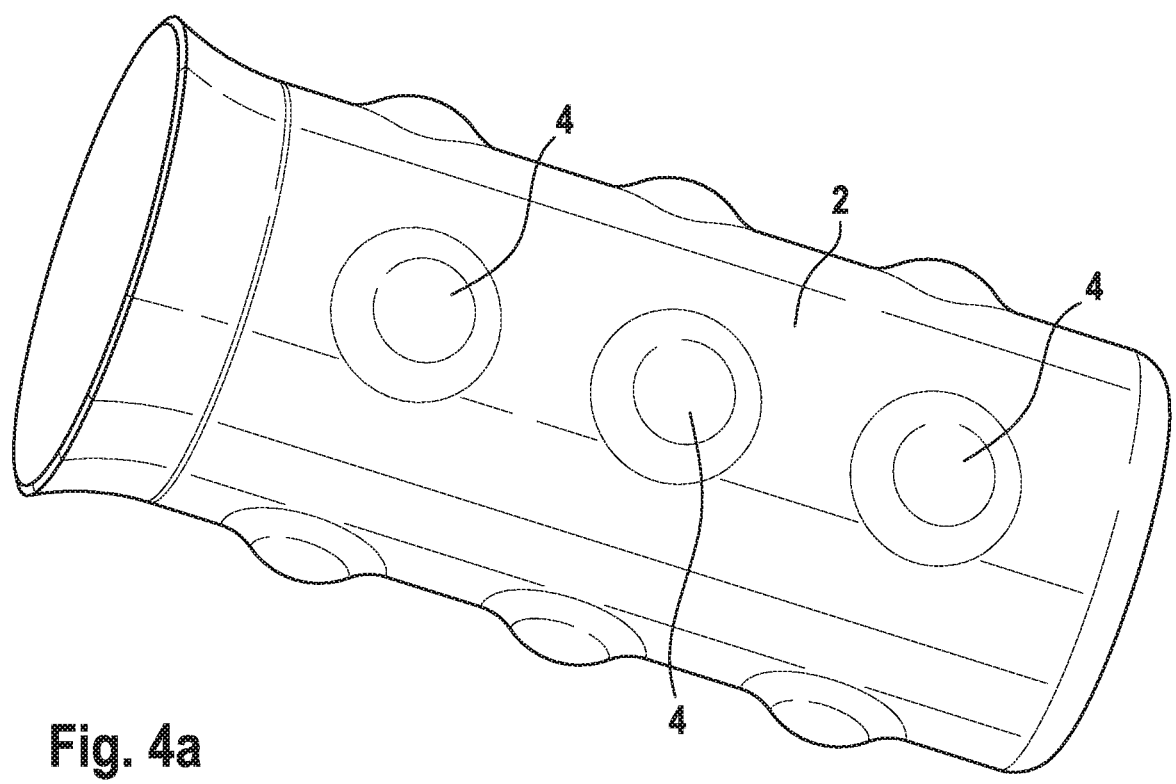
Figure 4B:
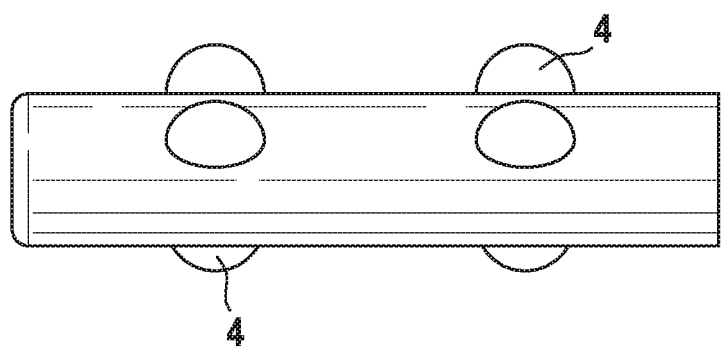
Figure 4C:
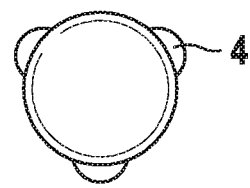

The exemplary embodiment of the cap 2 likewise illustrated in three views by means of FIGS. 4A-4C has spring elements 4 which are different in comparison to the cap 2 from FIG. 2. Like those described in the context of FIGS. 2A-2C, these spring elements 4 are disposed so as to be symmetrical.

Said spring elements are forced out in the manner of elevations, in an exemplary manner as a spherical segment, and are configured so as to be tight. An annular seal for the wheel speed sensor is therefore advantageous in the case of this exemplary embodiment. Forcing these spring elements 4 out is carried out according to the example as an embossing or deep-drawing procedure.

The invention claimed is:

1. A wheel speed sensor having at least one sensor element, and at least one signal processing circuit, the speed sensor comprising:
   at least one first plastics-material housing which houses or at least partially exposes the sensor element and the signal processing circuit;
   a cap comprising a cylindrical sidewall; and
   the sensor has a clamping device which is connected so as to be integral to the cap and/or is integrated in the cap, the clamping device comprising a plurality of spring elements that are formed in one piece with the cylindrical sidewall by being punched out of the cylindrical sidewall.

2. The wheel speed sensor as claimed in claim 1, wherein the clamping device is configured as a clamping sleeve that is integrated in the cap.

3. The wheel speed sensor as claimed in claim 2, wherein the cap is connected to the first plastics-material housing by clinching and/or staking.

4. The wheel speed sensor as claimed in claim 1, wherein the cap is connected to the first plastics-material housing by clinching and/or staking.

5. The wheel speed sensor as claimed in claim 4, wherein the
   staking, or the clinching, respectively, between the cap and the first plastics-material housing is configured substantially as a form-fit, wherein the cap is push-fitted onto a collar of the first plastics-material housing, assumes a tight fit thereon and, by one or a plurality of contours which are configured so as to be finger-shaped and which are bent inward/toward the first plastics-material housing, engages in the material of the first plastics-material housing.

6. The wheel speed sensor as claimed in claim 1, wherein the spring elements are configured so as to bulge and/or curve outward, wherein said bulge is configured so as to be progressively curved or straight.

7. The wheel speed sensor as claimed in claim 1, wherein the cap is configured such that said cap in terms of a revolution about the cylindrical sidewall has two or three or more of the plurality of spring elements.

8. The wheel speed sensor as claimed in claim 7, wherein the speed sensor comprises a plurality of rows, and wherein each row comprises two or three or more of the plurality of spring elements.

9. The wheel speed sensor as claimed in claim 8, wherein said spring elements herein are disposed so as to be symmetrical and/or equidistant in relation to one another and/or in relation to the cylindrical sidewall of the cap.

10. The wheel speed sensor as claimed in claim 1, wherein said wheel speed sensor is configured as a wheel speed sensor for trucks.

* * * * *